United States Patent
Feng

(10) Patent No.: US 10,594,923 B2
(45) Date of Patent: Mar. 17, 2020

(54) METHOD, SYSTEM, AND MOBILE TERMINAL FOR ADJUSTING FOCAL LENGTH OF CAMERA

(71) Applicant: HuiZhou TCL Mobile Communication Co., Ltd., HuiZhou (CN)

(72) Inventor: Jianming Feng, HuiZhou (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 95 days.

(21) Appl. No.: 15/555,558

(22) PCT Filed: Dec. 14, 2016

(86) PCT No.: PCT/CN2016/109869
§ 371 (c)(1),
(2) Date: Sep. 5, 2017

(87) PCT Pub. No.: WO2017/215214
PCT Pub. Date: Dec. 21, 2017

(65) Prior Publication Data
US 2019/0007602 A1  Jan. 3, 2019

(30) Foreign Application Priority Data
Jun. 13, 2016 (CN) .......... 2016 1 0419087

(51) Int. Cl.
H04N 5/232 (2006.01)
G06F 3/01 (2006.01)

(52) U.S. Cl.
CPC ........ *H04N 5/23216* (2013.01); *G06F 3/017* (2013.01); *H04N 5/232* (2013.01); *H04N 5/23258* (2013.01)

(58) Field of Classification Search
CPC ............................ H04N 5/23216; G06F 3/017
See application file for complete search history.

(56) References Cited

U.S. PATENT DOCUMENTS

| | | |
|---|---|---|
| 8,907,897 B2 | 12/2014 | Ferren et al. |
| 2008/0240698 A1 | 10/2008 | Bartilson et al. |
| 2012/0120277 A1* | 5/2012 | Tsai .................. H04N 5/23212 348/223.1 |

(Continued)

FOREIGN PATENT DOCUMENTS

| | | |
|---|---|---|
| CN | 102055844 | 5/2011 |
| CN | 102804107 | 1/2012 |

(Continued)

*Primary Examiner* — Lin Ye
*Assistant Examiner* — John H Morehead, III

(57) ABSTRACT

A method, a system, a mobile terminal for adjusting focal length of the camera includes monitoring, by the proximity sensor arranged on multi-functional keys of a side of the mobile terminal, movement direction, movement distance, and movement time of fingers in real-time, and uploading the movement direction, the movement distance, and the movement time to an application processor of the camera. An application processor of the camera provides analyzed data of the movement direction, the movement distance, and the movement time, and adjusts the focal length of the camera according to a result of the analyzed data.

20 Claims, 3 Drawing Sheets

```
Monitoring movement direction, movement distance, and movement
time of fingers in real-time using the proximity sensor arranged on
the multi-functional keys of the side of the mobile terminal, and     ── S1
uploading the movement direction, the movement distance, and the
movement time to the application processor of the camera when the
user uses a camera of the mobile terminal to take Providing, by the application processor of the camera, analyzed data
of the movement direction, the movement distance, and the            ── S2
movement time, and adjusting the focal length of the camera
according to a result of the analyzed data
```

(56) References Cited

U.S. PATENT DOCUMENTS

| | | | | |
|---|---|---|---|---|
| 2014/0098273 | A1* | 4/2014 | Ito | H04N 5/23216 |
| | | | | 348/333.03 |
| 2015/0062033 | A1* | 3/2015 | Ishihara | G06F 3/017 |
| | | | | 345/173 |
| 2015/0215524 | A1* | 7/2015 | Zhu | H04N 5/23216 |
| | | | | 348/240.99 |
| 2015/0229837 | A1* | 8/2015 | Her | H04N 5/23219 |
| | | | | 348/222.1 |
| 2016/0327950 | A1* | 11/2016 | Bachrach | B64C 39/024 |

FOREIGN PATENT DOCUMENTS

| | | |
|---|---|---|
| CN | 105100609 | 11/2015 |
| CN | 105208277 | 12/2015 |
| CN | 106101532 | 11/2016 |

\* cited by examiner

```
┌─────────────────────────────────────────────────────────────┐
│  Monitoring movement direction, movement distance, and movement │
│  time of fingers in real-time using the proximity sensor arranged on │
│  the multi-functional keys of the side of the mobile terminal, and  │──── S1
│  uploading the movement direction, the movement distance, and the │
│  movement time to the application processor of the camera when the │
│      user uses a camera of the mobile terminal to take           │
└─────────────────────────────────────────────────────────────┘
                              │
                              ▼
┌─────────────────────────────────────────────────────────────┐
│  Providing, by the application processor of the camera, analyzed data │
│    of the movement direction, the movement distance, and the      │──── S2
│    movement time, and adjusting the focal length of the camera    │
│           according to a result of the analyzed data              │
└─────────────────────────────────────────────────────────────┘
```

FIG. 1

```
┌─────────────────────────────────────────────────────────────┐
│      Predetermining a focusing mode in the application       │──── S21
│                  processor of the camera                     │
└─────────────────────────────────────────────────────────────┘
                              │
                              ▼
┌─────────────────────────────────────────────────────────────┐
│  Matching, by the application processor of the camera, the   │──── S22
│      focusing mode according to the analyzed data, and       │
│    correspondingly adjusting the focal length of the camera  │
└─────────────────────────────────────────────────────────────┘
```

FIG. 2

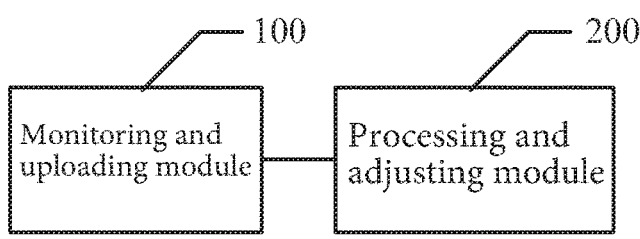

FIG. 3

METHOD, SYSTEM, AND MOBILE TERMINAL FOR ADJUSTING FOCAL LENGTH OF CAMERA

RELATED APPLICATIONS

This application is a National Phase of PCT Patent Application No. PCT/CN2016/109869 having International filing date of Dec. 14, 2016, which claims the benefit of priority of Chinese Patent Application No. 201610419087.5 filed on Jun. 13, 2016. The contents of the above applications are all incorporated by reference as if fully set forth herein in their entirety.

FIELD AND BACKGROUND OF THE INVENTION

The present disclosure relates to field of mobile terminals, and more particularly, to a method, a system, and a mobile terminal for adjusting focal length of a camera.

With popularization of mobile terminals, more and more users use the mobile terminals to take pictures. However, adjusting focal length of most current mobile terminals requires the moving of two fingers on a screen. The problem for the above method is that when two hands are holding the mobile terminal to take pictures, one hand needs to be removed in order to adjust the focal length on the screen, and the same hand needs to hold the mobile terminal again after the focal length has been adjusted. Because the hand needs to removed and re-hold, the mobile terminal may shake and the focal length needs to be adjusted yet again. Thus, the above mobile terminal has bad operability and low stability.

Therefore, the prior art needs to be improved and developed.

SUMMARY OF THE INVENTION

Based on deficiency of the prior art, the aim of the present disclosure is to provide a method, a system, and a mobile terminal for adjusting focal length of a camera capable of solving an issue that a camera focusing mode in a conventional mobile has bad operability and low stability.

The technical scheme of the present disclosure is as follow:

A method for adjusting focal length of the camera comprising:

determining whether distance between current fingers and a proximity sensor is within an effective distance of the proximity sensor when a camera of a mobile terminal takes pictures; wherein the proximity sensor is arranged on multi-functional keys of a side of the mobile terminal;

monitoring, by the proximity sensor, movement direction, movement distance, and movement time of fingers in real-time, and uploading the movement direction, the movement distance, and the movement time to a application processor of the camera when the distance between the current fingers and the proximity sensor is within the effective distance of the proximity sensor; and providing, by the application processor of the camera, analyzed data of the movement direction, the movement distance, and the movement time, and adjusting the focal length of the camera according to a result of the analyzed data.

Furthermore, before the step for determining whether the distance between the current fingers and the proximity sensor is within an effective distance of the proximity sensor when the camera of the mobile terminal takes pictures, the method further comprises:

setting the effective distance of the proximity sensor, wherein the effective distance is set according to use habits of users; and ending, by the proximity sensor, operation when the distance between the current finger and the proximity sensor is not within the effective distance of the proximity sensor.

Furthermore, the effective distance is 15 mm.

Furthermore, the proximity sensor comprises a light transmitter and a light receiver. The movement direction, the movement distance, and the movement time are calculated by the light transmitter and the light receiver.

Furthermore, the step for providing, by the application processor of the camera, the analyzed data of the movement direction, the movement distance, and the movement time, and adjusting the focal length of the camera according to the result of the analyzed data, the step comprises:

predetermining a focusing mode in the application processor of the camera; and matching, by the application processor of the camera, the focusing mode according to the result of the analyzed data, and correspondingly adjusting the focal length of the camera.

Furthermore, the step for predetermining the focusing mode in the application processor of the camera, the step particularly comprises:

adjusting the focal length of the camera, and making an image smaller by 10% when the proximity sensor monitors that the fingers move from up to down within the effective distance of the proximity sensor, the movement distance is less than or equal to 5 mm, and the movement time is greater than or equal to 30 ms;

adjusting the focal length of the camera, and making the image smaller by 50% when the proximity sensor monitors that the fingers move from up to down within the effective distance of the proximity sensor, the movement distance is greater than 5 mm, and the movement time is less than 30 ms;

adjusting the focal length of the camera, and enlarging the image 10% when the proximity sensor monitors that the fingers move from down to up within the effective distance of the proximity sensor, the movement distance is less than or equal to 5 mm, and the movement time is greater than or equal to 30 ms; and adjusting the focal length of the camera, and enlarging the image 100% when the proximity sensor monitors that the fingers move from down to up within the effective distance of the proximity sensor, the movement distance is greater than 5 mm, and the movement time is less than 30 ms.

Furthermore, the step for predetermining the focusing mode in the application processor of the camera, the step further comprises:

ignoring by the application processor of the camera, movement of the fingers when the proximity sensor monitors that the fingers move from up to down or from down to up within the effective distance of the proximity sensor, the movement distance is greater than 5 mm, and the movement time is greater than 30 ms; or the movement distance is less than 5 mm, and the movement time is less than 30 ms.

A system for adjusting the focal length of the camera, comprising:

a monitoring and uploading module configured to monitor movement direction, movement distance, and movement time of fingers in real-time using a proximity sensor arranged on multi-functional keys of a side of a mobile terminal, and upload the movement direction, the movement distance, and the movement time to a application processor of the camera when a camera of the mobile terminal takes pictures; and an processing and adjusting module configured to provide analyzed data of the movement direction, the movement distance, and the movement time by the application processor of the camera, and adjusting the focal length of the camera according to the result of the analyzed data.

Furthermore, the system further comprises:

a determining module configured to determine whether distance between current fingers and the proximity sensor is within an effective distance of the proximity sensor; when the distance between the current fingers and the proximity sensor is within the effective distance of the proximity sensor, the real-time monitoring send module is started; when the distance between the current finger and the proximity sensor is not within the effective distance of the proximity sensor, operation ends.

Furthermore, the determining module comprises:

a setting unit configured to set the effective distance of the proximity sensor according to use habits of users.

Furthermore, the effective distance is 15 mm.

Furthermore, the proximity sensor comprises a light transmitter and a light receiver. The movement direction, the movement distance, and the movement time are calculated by the light transmitter and the light receiver.

Furthermore, the processing and adjusting module comprises:

a predetermined unit configured to predetermine a focusing mode in the application processor of the camera; and a focusing unit configured to match the focusing mode according to the result of the analyzed data by the application processor of the camera, and correspondingly adjust the focal length of the camera.

Furthermore, the focusing unit comprises:

a first shrink subunit configured to adjust the focal length of the camera, and make image smaller by 10% when the proximity sensor monitors that the fingers move from up to down within the effective distance of the proximity sensor, the movement distance is less than or equal to 5 mm, and the movement time is greater than or equal to 30 ms;

a second shrink subunit configured to adjust the focal length of the camera, and make the image smaller by 50% when the proximity sensor monitors that the fingers move from up to down within the effective distance of the proximity sensor, the movement distance is greater than 5 mm, and the movement time is less than 30 ms;

a first enlarge subunit configured to adjust the focal length of the camera, and enlarge the image 10% when the proximity sensor monitors that the fingers move from down to up within the effective distance of the proximity sensor, the movement distance is less than or equal to 5 mm, and the movement time is greater than or equal to 30 ms; and a second enlarge subunit configured to adjust the focal length of the camera, and enlarge the image 100% when the proximity sensor monitors that the fingers move from down to up within the effective distance of the proximity sensor, the movement distance is greater than 5 mm, and the movement time is less than 30 ms.

Furthermore, the focusing unit further comprises:

an ignore subunit configured to ignore the movement of the fingers when the proximity sensor monitors the fingers move from up to down or from down to up within the effective distance of the proximity sensor. The movement distance is greater than 5 mm, and the movement time is greater than 30 ms; or the movement distance is less than 5 mm, and the movement time is less than 30 ms.

A mobile terminal, comprising:

a proximity sensor arranged on multi-functional keys of a side of the mobile terminal;

a camera;

one or more processors comprising an application processor of the camera;

a memory; and one or more application programs.

The one or more application programs are stored in the memory and are executed by the application processor of the camera; the one or more application programs comprise operational orders executing the following steps:

monitoring, by the proximity sensor, movement direction, movement distance, and movement time of fingers in real-time, and uploading the movement direction, the movement distance, and the movement time to the application processor of the camera when using the camera is used to take pictures; and providing, by the application processor of the camera, analyzed data of the movement direction, the movement distance, and the movement time, and adjusting the focal length of the camera according to result of the analyzed data.

Furthermore, the operational orders further comprises and executes following steps:

determining, by the application processor of the camera, whether distance between current fingers and the proximity sensor is within the effective distance of the proximity sensor; wherein the effective distance is set according to use habits of users;

if the distance between the current fingers and the proximity sensor is within the effective distance of the proximity sensor, the proximity sensor monitors the movement direction, the movement distance, and the movement time of the fingers in real-time when taking pictures;

if the distance between the current fingers and the proximity sensor is not within the effective distance of the proximity sensor, operation of the proximity sensor ends.

Furthermore, the step for providing, by the application processor of the camera, the analyzed data of the movement direction, the movement distance, and the movement time, and adjusting the focal length of the camera according to result of the analyzed data, the step comprises:

predetermining a focusing mode in the application processor of the camera; and matching, by the application processor of the camera, the focusing mode according to the result of the analyzed data, and correspondingly adjusting the focal length of the camera.

Furthermore, the step for predetermining the focusing mode in the application processor of the camera, the step comprises:

adjusting the focal length of the camera, and making an image smaller by 10% when the proximity sensor monitors that the fingers move from up to down within the effective distance of the proximity sensor, the movement distance is less than or equal to 5 mm, and the movement time is greater than or equal to 30 ms;

adjusting the focal length of the camera, and making the image smaller 50% when the proximity sensor monitors that the fingers move from up to down within the effective distance of the proximity sensor, the movement distance is greater than 5 mm, and the movement time is less than 30 ms;

adjusting the focal length of the camera, and enlarging the image 10% when the proximity sensor monitors that the fingers move from down to up within the effective distance of the proximity sensor, the movement distance is less than or equal to 5 mm, and the movement time is greater than or equal to 30 ms; and adjusting the focal length of the camera, and enlarging the image 100% when the proximity sensor monitors that the fingers move from down to up within the effective distance of the proximity sensor, the movement distance is greater than 5 mm, and the movement time is less than 30 ms.

Furthermore, the step for predetermining the focusing mode in the application processor of the camera, the step further comprises:

ignoring, by the application processor of the camera, movement of the fingers when the proximity sensor monitors that the fingers move from up to down or from down to up within the effective distance of the proximity sensor, the movement distance is greater than 5 mm, and the movement time is greater than 30 ms; or the movement distance is less than 5 mm, and the movement time is less than 30 ms.

The present disclosure uses that the proximity sensor is arranged on the multi-functional keys of the side of the mobile terminal to monitor the movement information of fingers by the proximity sensor, and adjust the focal length of the camera according to the movement information. The method for adjusting the focal length of the camera in the present disclosure has advantages of simple operation and high stability, and can effectively improve the image quality.

BRIEF DESCRIPTION OF THE SEVERAL VIEWS OF THE DRAWINGS

FIG. 1 is a flowchart of a method for adjusting focal length of a camera based on multi-functional keys on a side of a mobile terminal according to a preferred embodiment of the present disclosure.

FIG. 2 is a flowchart of the step 2 of FIG. 1 according to the present disclosure.

FIG. 3 is a structural schematic diagram of a system for adjusting the focal length of the camera based on the multi-functional keys on the side of the mobile terminal according to the preferred embodiment of the present disclosure.

DESCRIPTION OF SPECIFIC EMBODIMENTS OF THE INVENTION

Figure 4:
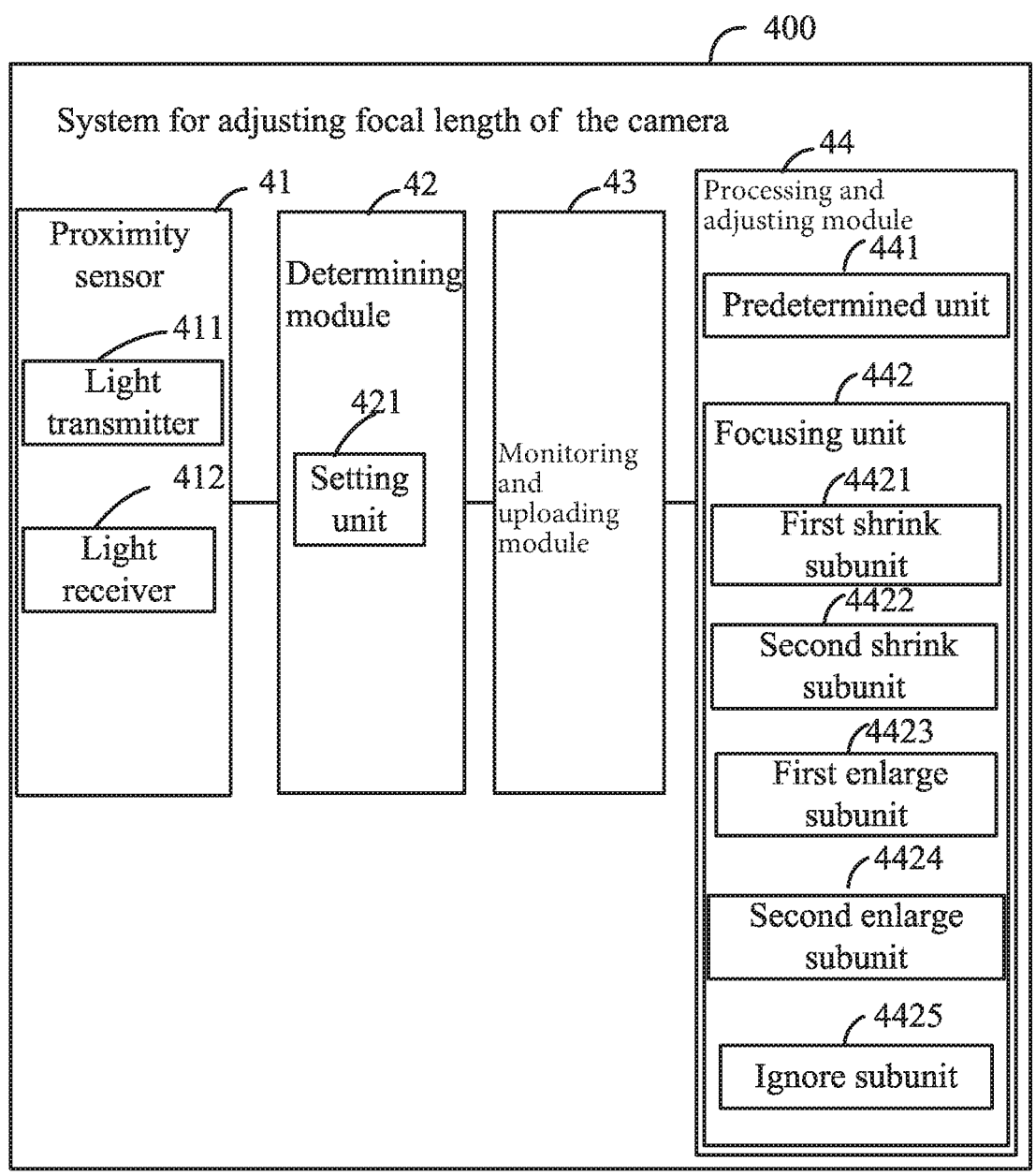
FIG. 4 is the other structural schematic diagram of a system for adjusting the focal length of the camera based on the multi-functional keys on the side of the mobile terminal according to the preferred embodiment of the present disclosure.

The present disclosure provides a method and a system for adjusting focal length of the camera. In order to more clearly and definitely illustrate aim, the technical scheme and effects of the present disclosure, the present disclosure will further be described in detail according to the drawing. It should be understood that the present disclosure has been described with reference to certain preferred and alternative embodiments which are intended to be exemplary only and do not limit the full scope of the present disclosure.

As shown in FIG. 1, FIG. 1 is a flowchart of a method for adjusting focal length of a camera based on multi-functional keys on a side of a mobile terminal, the method comprising:

S1: monitoring movement direction, movement distance, and movement time of fingers in real-time using a proximity sensor arranged on the multi-functional keys of the side of the mobile terminal, and uploading the movement direction, the movement distance, and the movement time to an application processor of the camera when a user uses a camera of the mobile terminal to take pictures;

S2: providing, by the application processor of the camera, analyzed data of the movement direction, the movement distance, and the movement time, and adjusting the focal length of the camera according to a result of the analyzed data.

In the present disclosure, the proximity sensor is arranged on the multi-functional keys of the side of the mobile terminal. When the user holds the mobile terminal to take pictures using both hands, the focal length of the camera is adjusted by moving fingers on the proximity sensor while holding the mobile terminal. To be specific, the proximity sensor monitors the movement direction, the movement distance, and the movement time of the fingers in real-time on the proximity sensor, and the movement direction, the movement distance, and the movement time on the proximity sensor are uploaded to the application processor of the camera. The application processor of the camera analyzes data according to the movement direction, the movement distance, and the movement time, and adjusts the focal length of the camera according to the analyzed data. The method for adjusting the focal length of the camera in the present disclosure has advantages of simple operation and high stability, and can effectively improve the image quality.

Before the S1, the method further comprises: determining whether distance between current fingers and the proximity sensor is within an effective distance of the proximity sensor. When the distance between current finger and the proximity sensor is within the effective distance of the proximity sensor, the method enters S1. When the distance between current finger and the proximity sensor is not within the effective distance of the proximity sensor, operational work ends. To be specific, the proximity sensor sets the effective distance, for example: the effective distance is 15 mm. Namely, only when the distance between current finger and the proximity sensor is less than or equal to 15 mm, the proximity sensor starts to monitor the movement direction, the movement distance, and the movement time of finger in real-time on the proximity sensor, and the movement direction, the movement distance, and the movement time on the proximity sensor are uploaded to the application processor of the camera. The application processor of the camera adjusts the focal length of the camera according to the movement direction, the movement distance, and the movement time. It should be understood that the effective distance can be set as other numerical values, and the effective distance is set according to use habits of users. The present disclosure effectively avoids mistaken operation of the user by setting the effective distance for the proximity sensor and reduces power consumption of the proximity sensor.

Furthermore, in the present distance, the proximity sensor comprises a light transmitter and a light receiver. The movement direction, the movement distance, and the movement time all are calculated by the light transmitter and the light receiver (a specific computing method is prior art, there will be not described).

In the S2, the application processor of the camera adjusts the focal length of the camera according to the movement direction, the movement distance, and the movement time, as shown in FIG. 2, the S2 particularly comprises:

S21: predetermining a focusing mode in the application processor of the camera;

S22: matching, by the application processor of the camera, the focusing mode according to the analyzed data, and correspondingly adjusting the focal length of the camera.

To be specific, a first end of the application processor of the camera is electrically connected with the proximity sensor by an inter-integrated circuit (I2C) control bus. The movement direction, the movement distance, and the movement time monitored by the proximity sensor are uploaded to the application processor of the camera. The predetermined focusing mode is stored in the application processor of the camera. Furthermore, in the present disclosure, the predetermined focusing mode particularly comprises:

controlling, by the application processor of the camera, the camera to adjust the focal length of the camera, and making image smaller by 10% when the proximity sensor monitors that the fingers move from up to down within the effective distance of the proximity sensor, the movement distance is less than or equal to 5 mm, and the movement time is greater than or equal to 30 ms;

controlling, by the application processor of the camera, the camera to adjust the focal length of the camera, and making the image smaller by 50% when the proximity sensor monitors that the fingers move from up to down within the effective distance of the proximity sensor, the movement distance is greater than 5 mm, and the movement time is less than 30 ms;

controlling, by the application processor of the camera, the camera to adjust the focal length of the camera, and enlarging the image 10% when the proximity sensor monitors that the fingers move from down to up within the effective distance of the proximity sensor, the movement distance is less than or equal to 5 mm, and the movement time is greater than or equal to 30 ms;

controlling, by the application processor of the camera, the camera to adjust the focal length of the camera, and enlarging the image 100% when the proximity sensor monitors that the fingers move from down to up within the effective distance of the proximity sensor, the movement distance is greater than 5 mm, and the movement time is less than 30 ms.

Furthermore, the predetermined focusing mode further comprises:

stopping processing the focal length of the camera by the application processor of the camera when the proximity sensor monitors that the figures move from up to down or from down to up within the effective distance of the proximity sensor, the movement distance is greater than 5 mm, and the movement time is greater than 30 ms; and stopping processing the focal length of the camera by the application processor of the camera when the proximity sensor monitors that the fingers move from up to down or from down to up within the effective distance of the proximity sensor, the movement distance is less than 5 mm, and the movement time is less than 30 ms.

For the above two steps for stopping processing the focal length of the camera, often because the user does mistaken operation.

The application processor of the camera operates according to the predetermined focusing mode according to the movement direction, the movement distance, and the movement time. The present disclosure only needs user to use the finger to move on the proximity sensor, and adjusts the focal length of the camera of the mobile terminal. The method for adjusting the focal length of the camera in the present disclosure has advantages of simple operation and high stability, and can effectively improve image quality.

Based on the above method, the present disclosure provides the system for adjusting focal length of the camera based on the multi-functional keys on the side of the mobile terminal, as shown in FIG. 3, the system comprises:

a monitoring and uploading module 100 configured to monitor movement direction, movement distance, and movement time of fingers in real-time using a proximity sensor arranged on the multi-functional keys of the side of the mobile terminal, and upload the movement direction, the movement distance, and the movement time to an application processor of the camera when the user uses the camera of the mobile terminal to take pictures; and an processing and adjusting module 200 configured to provide the analyzed data of the movement direction, the movement distance, and the movement time by the application processor of the camera, and adjusting the focal length of the camera according to the result of the analyzed data.

To be specific, as shown in FIG. 4, the system for adjusting focal length of the camera 400 comprises:

the proximity sensor 41 arranged on the multi-functional keys of the side of the mobile terminal;

the proximity sensor 41 comprises the light transmitter 411 and the light receiver 412. The movement direction, the movement distance, and the movement time all are calculated by the light transmitter and the light receiver;

a determining module 42 configured to determine whether distance between current finger and the proximity sensor is within an effective distance of the proximity sensor. When the distance between current fingers and the proximity sensor is within the effective distance of the proximity sensor, enter into S1. When the distance between current finger and the proximity sensor is not within the effective distance of the proximity sensor, operational work ends.

Furthermore, the determining module 42 comprises:

a setting unit 421 configured to set the effective distance of the proximity sensor according to use habits of users, for example, the effective distance is 15 mm.

a monitoring and uploading module 43 is configured to the monitor movement direction, the movement distance, and the movement time of fingers in real-time using the proximity sensor arranged on the multi-functional keys of the side of the mobile terminal, and upload the movement direction, the movement distance, and the movement time to an application processor of the camera when the camera of the mobile terminal is used to take pictures; and a processing and adjusting module 44 is configured to provide the analyzed data of the movement direction, the movement distance, and the movement time by the application processor of the camera, and adjusting the focal length of the camera according to the result of the analyzed data.

The processing and adjusting module 44 comprises:

a predetermined unit 441 configured to predetermine the focusing mode in the application processor of the camera; and a focusing unit 442 configured to match the focusing mode according to the analytical result by the application processor of the camera, and correspondingly adjust the focal length of the camera.

Furthermore, the focusing unit 442 comprises:

a first shrink subunit 4421 configured to adjust the focal length of the camera, and make image smaller by 10% when the proximity sensor monitors the fingers move from up to down within the effective distance of the proximity sensor, the movement distance is less than or equal to 5 mm, and the movement time is greater than or equal to 30 ms;

a second shrink subunit 4422 configured to adjust the focal length of the camera, and make image smaller by 50% when the proximity sensor monitors the figure move from up to down within the effective distance of the proximity sensor, the movement distance is greater than 5 mm, and the movement time is less than 30 ms;

a first enlarge subunit 4423 configured to adjust the focal length of the camera, and enlarge image 10% when the proximity sensor monitors the figure move from down to up within the effective distance of the proximity sensor, the movement distance is less than or equal to 5 mm, and the movement time is greater than or equal to 30 ms; and a second enlarge subunit 4424 configured to adjust the focal length of the camera, and enlarge image 100% when the proximity sensor monitors the figure move from down to up within the effective distance of the proximity sensor, the movement distance is greater than 5 mm, and the movement time is less than 30 ms.

an ignore subunit 4425 configured to ignore the focal length of the camera by the application processor of the camera when the proximity sensor monitors the figure move from up to down or from down to up within the effective distance of the proximity sensor, the movement distance is greater than 5 mm, and the movement time is greater than 30 ms; or the movement distance is less than 5 mm, and the movement time is less than 30 ms.

Figure 5:
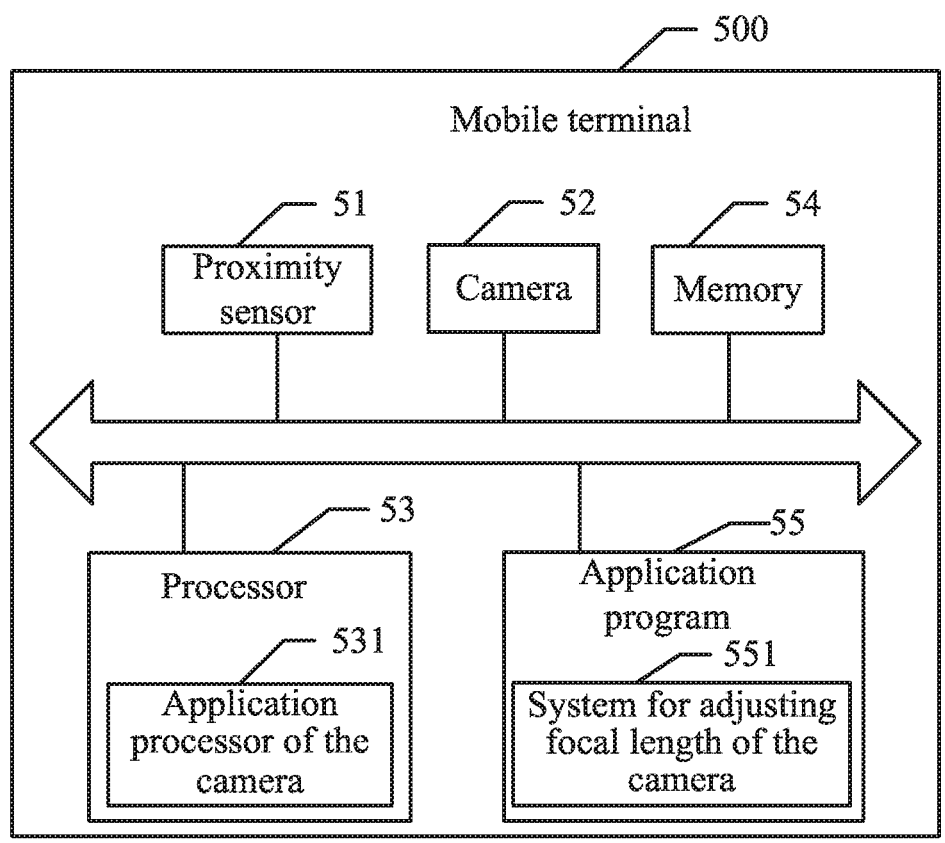
FIG. 5 is a structural schematic diagram of the mobile terminal according to the present disclosure.

Based on the method and the system for adjusting focal length of the camera, the present disclosure further provides the mobile terminal, as shown in FIG. 5. The mobile terminal 500 comprises the proximity sensor arranged on the multi-functional keys of the side of the mobile terminal, the camera 52, one or more processors 53 comprising the application processor of the camera 531, a memory 54, and one or more application programs 55.

The one or more application programs 55 are stored in the memory 54 and are executed by the application processor of the camera 531. The one or more application programs 55 comprise operational orders executing the method for adjusting focal length of the camera or operating the system for adjusting focal length of the camera 551.

On the above all, the present disclosure uses that the proximity sensor is arranged on the multi-functional keys of the side of the mobile terminal to monitor the movement information of fingers by the proximity sensor, and adjust the focal length of the camera according to the movement information. The method for adjusting the focal length of the camera in the present disclosure has advantages of simple operation and high stability, and can effectively improve the image quality.

It should be understood that present disclosure is not limited to the exemplary examples. Person skilled in the art should understand and achieve that equivalent replacement and improvement is according to the above description. The equivalent replacements and improvements should be considered to belong to the protection scope of the present disclosure.

What is claimed is:

1. A method for adjusting focal length of a camera, comprising:

determining whether a distance between current fingers and a proximity sensor is within an effective predetermined distance of the proximity sensor when a camera of a mobile terminal takes pictures; wherein the proximity sensor is arranged on multi-functional keys of a side of the mobile terminal;

monitoring, by the proximity sensor, movement direction, movement distance, and movement time of the fingers in real-time, and uploading the movement direction, the movement distance, and the movement time to an application processor of the camera when the distance between the current fingers and the proximity sensor is within the effective predetermined distance of the proximity sensor; and providing, by the application processor of the camera, analyzed data of the movement direction, the movement distance, and the movement time, and adjusting the focal length of the camera according to a result of the analyzed data.

2. The method for adjusting the focal length of the camera as claimed in claim 1, wherein before the step for determining whether the distance between the current fingers and the proximity sensor is within the effective predetermined distance of the proximity sensor when the camera of the mobile terminal takes pictures, the method further comprises:

setting the effective predetermined distance of the proximity sensor, wherein the effective predetermined distance is set according to use habits of users previous finger placement of the fingers; and ending, by the proximity sensor, operation when the distance between the current fingers and the proximity sensor is not within the effective predetermined distance of the proximity sensor.

3. The method for adjusting the focal length of the camera as claimed in claim 2, wherein the effective predetermined distance is 15 mm.

4. The method for adjusting the focal length of the camera as claimed in claim 1, wherein the proximity sensor comprises a light transmitter and a light receiver; the movement direction, the movement distance, and the movement time are calculated by the light transmitter and the light receiver.

5. The method for adjusting the focal length of the camera as claimed in claim 1, wherein the step for providing, by the application processor of the camera, the analyzed data of the movement direction, the movement distance, and the movement time, and adjusting the focal length of the camera according to the result of the analyzed data, the step comprises:

predetermining a focusing mode in the application processor of the camera; and matching, by the application processor of the camera, the focusing mode according to the result of the analyzed data, and correspondingly adjusting the focal length of the camera.

6. The method for adjusting the focal length of the camera as claimed in claim 5, wherein the step for predetermining the focusing mode in the application processor of the camera, the step particularly comprises:

adjusting the focal length of the camera, and making an image taken by the camera smaller by 10% when the proximity sensor monitors that the fingers move from up to down within the effective predetermined distance of the proximity sensor, the movement distance is less than or equal to 5 mm, and the movement time is greater than or equal to 30 ms;

adjusting the focal length of the camera, and making the image smaller by 50% when the proximity sensor monitors that the fingers move from up to down within the effective predetermined distance of the proximity sensor, the movement distance is greater than 5 mm, and the movement time is less than 30 ms;

adjusting the focal length of the camera, and enlarging the image 10% when the proximity sensor monitors that the fingers move from down to up within the effective predetermined distance of the proximity sensor, the movement distance is less than or equal to 5 mm, and the movement time is greater than or equal to 30 ms; and adjusting the focal length of the camera, and enlarging the image 100% when the proximity sensor monitors that the fingers move from down to up within the effective predetermined distance of the proximity sensor, the movement distance is greater than 5 mm, and the movement time is less than 30 ms.

7. The method for adjusting the focal length of the camera as claimed in claim 5, wherein the step for predetermining the focusing mode in the application processor of the camera, the step further comprises:

ignoring, by the application processor of the camera, movement of the fingers when the proximity sensor monitors that the fingers move from up to down or from down to up within the effective predetermined distance of the proximity sensor, the movement distance is greater than 5 mm, and the movement time is greater than 30 ms; or the movement distance is less than 5 mm, and the movement time is less than 30 ms.

8. A mobile terminal comprising:
a proximity sensor arranged on multi-functional keys of a side of the mobile terminal;
a camera;
one or more processors comprising an application processor of the camera;
a memory; and
one or more application programs;
wherein the one or more application programs are stored in the memory and are executed by the application processor of the camera; the one or more application programs comprising operational orders executing the following steps:
monitoring, by the proximity sensor, movement direction, movement distance, and movement time of fingers in real-time, and uploading the movement direction, the movement distance, and the movement time to the application processor of the camera when the camera is used to take pictures; and
providing, by the application processor of the camera, analyzed data of the movement direction, the movement distance, and the movement time, and adjusting focal length of the camera according to a result of the analyzed data.

9. The mobile terminal as claimed in claim 8, wherein the operational orders further comprises and executes follow steps:
determining, by the application processor of the camera, whether distance between current fingers and the proximity sensor is within the effective predetermined distance of the proximity sensor; wherein the effective predetermined distance is set according to use habits of users previous finger placement of the fingers;
if the distance between the current fingers and the proximity sensor is within the effective predetermined distance of the proximity sensor, the proximity sensor monitors the movement direction, the movement distance, and the movement time of the fingers in real-time when taking pictures;
if the distance between the current fingers and the proximity sensor is not within the effective predetermined distance of the proximity sensor, ending operation of the proximity sensor.

10. The mobile terminal as claimed in claim 8, wherein the step for providing, by the application processor of the camera, the analyzed data of the movement direction, the movement distance, and the movement time, and adjusting the focal length of the camera according to the result of the analyzed data, the step comprises:
predetermining a focusing mode in the application processor of the camera; and matching, by the application processor of the camera, the focusing mode according to the result of the analyzed data, and correspondingly adjusting the focal length of the camera.

11. The mobile terminal as claimed in claim 10, wherein the step for predetermining the focusing mode in the application processor of the camera, the step comprises:
adjusting the focal length of the camera, and making an image taken by the camera smaller by 10% when the proximity sensor monitors that the fingers move from up to down within the effective predetermined distance of the proximity sensor, the movement distance is less than or equal to 5 mm, and the movement time is greater than or equal to 30 ms;
adjusting the focal length of the camera, and making the image smaller by 50% when the proximity sensor monitors that the fingers move from up to down within the effective predetermined distance of the proximity sensor, the movement distance is greater than 5 mm, and the movement time is less than 30 ms;
adjusting the focal length of the camera, and enlarging the image 10% when the proximity sensor monitors that the fingers move from down to up within the effective predetermined distance of the proximity sensor, the movement distance is less than or equal to 5 mm, and the movement time is greater than or equal to 30 ms; and
adjusting the focal length of the camera, and enlarging the image 100% when the proximity sensor monitors that the fingers move from down to up within the effective predetermined distance of the proximity sensor, the movement distance is greater than 5 mm, and the movement time is less than 30 ms.

12. The terminal as claimed in claim 10, wherein the step for predetermining the focusing mode in the application processor of the camera, the step further comprises:
ignoring, by the application processor of the camera, movement of the fingers when the proximity sensor monitors that the fingers move from up to down or from down to up within the effective predetermined distance of the proximity sensor, the movement distance is greater than 5 mm, and the movement time is greater than 30 ms; or the movement distance is less than 5 mm, and the movement time is less than 30 ms.

13. A mobile terminal comprising:
a proximity sensor arranged on keys of a side of the mobile terminal;
a camera;
a memory; and
an application processor configured to execute a method, the method comprising:
monitoring a movement direction, a movement distance, and movement time of fingers of a user in real-time using the proximity sensor, and upload the movement direction, the movement distance, and the movement time to the application processor when the camera of the mobile terminal takes pictures; and
providing analyzed data of the movement direction, the movement distance, and the movement time, and adjusting a focal length of the camera according to a result of the analyzed data.

14. The mobile terminal as claimed in claim 13, wherein the method further comprises:
  determining whether a distance between fingers and the proximity sensor is within a predetermined distance of the proximity sensor; wherein when the distance between the fingers and the proximity sensor is within the predetermined distance of the proximity sensor, a monitoring and uploading module is started; wherein when the distance between the fingers and the proximity sensor is not within the predetermined distance of the proximity sensor, operation ends.

15. The mobile terminal as claimed in claim 14, wherein the method further comprises:
  setting the predetermined distance of the proximity sensor according to previous finger placement of the fingers.

16. The mobile terminal as claimed in claim 15, wherein the predetermined distance is 15 mm.

17. The mobile terminal as claimed in claim 13, wherein the proximity sensor comprises a light transmitter and a light receiver; the movement direction, the movement distance, and the movement time are calculated by the light transmitter and the light receiver.

18. The mobile terminal as claimed in claim 13, wherein the method further comprises:
  predetermining a focusing mode in the application processor; and
  matching the focusing mode according to the result of the analyzed data, and correspondingly adjust the focal length of the camera.

19. The mobile terminal as claimed in claim 18, wherein the method further comprises:
  adjusting the focal length of the camera, and make an image taken by the camera smaller by 10% when the proximity sensor monitors that the fingers move from up to down within the predetermined distance of the proximity sensor, the movement distance is less than or equal to 5 mm, and the movement time is greater than or equal to 30 ms;
  adjusting the focal length of the camera, and make the image smaller by 50% when the proximity sensor monitors that the fingers move from up to down within the predetermined distance of the proximity sensor, the movement distance is greater than 5 mm, and the movement time is less than 30 ms;
  adjusting the focal length of the camera, and enlarge the image 10% when the proximity sensor monitors that the fingers move from down to up within the predetermined distance of the proximity sensor, the movement distance is less than or equal to 5 mm, and the movement time is greater than or equal to 30 ms; and
  adjusting the focal length of the camera, and enlarge the image 100% when the proximity sensor monitors that the fingers move from down to up within the predetermined distance of the proximity sensor, the movement distance is greater than 5 mm, and the movement time is less than 30 ms.

20. The mobile terminal as claimed in claim 18, wherein the method further comprises:
  ignoring movement of the fingers when the proximity sensor monitors the fingers move from up to down or from down to up within the predetermined distance of the proximity sensor, the movement distance is greater than 5 mm, and the movement time is greater than 30 ms; or the movement distance is less than 5 mm, and the movement time is less than 30 ms.

* * * * *